(12) United States Patent
Rosewell

(10) Patent No.: US 9,875,264 B2
(45) Date of Patent: Jan. 23, 2018

(54) IDENTIFYING PROPERTIES OF A COMMUNICATION DEVICE

(71) Applicant: 51 Degrees Mobile Experts Limited, Reading (GB)

(72) Inventor: James William Rosewell, Reading (GB)

(73) Assignee: 51 DEGREES MOBILE EXPERTS LIMITED, Reading, Berkshire (GB)

( * ) Notice: Subject to any disclaimer, the term of this patent is extended or adjusted under 35 U.S.C. 154(b) by 0 days.

(21) Appl. No.: 15/133,048

(22) Filed: Apr. 19, 2016

(65) Prior Publication Data

US 2016/0232190 A1 Aug. 11, 2016

Related U.S. Application Data

(63) Continuation of application No. 14/085,223, filed on Nov. 20, 2013, now Pat. No. 9,332,086.

(30) Foreign Application Priority Data

Nov. 11, 2013 (EP) .................................... 13192291

(51) Int. Cl.
*G06F 17/30* (2006.01)
*H04L 29/08* (2006.01)
(Continued)

(52) U.S. Cl.
CPC .... *G06F 17/30327* (2013.01); *G06F 17/2705* (2013.01); *G06F 17/2765* (2013.01);
(Continued)

(58) Field of Classification Search
CPC ...................................................... G06F 17/30
(Continued)

(56) References Cited

U.S. PATENT DOCUMENTS 5,655,129 A 8/1997 Ito
7,010,522 B1 3/2006 Jagadish et al.
(Continued)

FOREIGN PATENT DOCUMENTS

WO WO 2009/101414 8/2009

OTHER PUBLICATIONS

Communication mailed by European Patent Office dated Mar. 27, 2014, in European Application No. 13192291.6-1870 (7 pages).
(Continued)

*Primary Examiner* — Vivek Srivastava
*Assistant Examiner* — Sibte Bukhari
(74) *Attorney, Agent, or Firm* — Finnegan, Henderson, Farabow, Garrett & Dunner, LLP

(57) ABSTRACT

A method (300) of generating information for use in identifying a property of a communication device (10) includes identifying (304) one or more substrings within a character string that identifies the communication device. For each substring, an entry is added (306) to a respective one of a plurality of data structures (800), each data structure being designated for storing substrings that occur at a particular character position within the character string. Each entry is associated (310) with a profile that includes a value of at least one property of the communication device. Also disclosed is a method (1000) of identifying the properties of a communication device based on such previously-generated information.

13 Claims, 9 Drawing Sheets

```
┌─────────────────┐
│     Area 1      │
├─────────────────┤
│ "Lorem ipsum    │
│ dolor sit amet, │
│ consectetur     │
│ adipisicing elit,│
│ sed do eiusmod  │
│ tempor          │
│ incididunt ut   │
│ labore et dolore│
└─────────────────┘
```

(51) Int. Cl.
*H04L 12/26* (2006.01)
*G06F 17/27* (2006.01)
(52) U.S. Cl.
CPC .. *G06F 17/30613* (2013.01); *G06F 17/30943* (2013.01); *H04L 43/50* (2013.01); *H04L 67/02* (2013.01); *H04L 67/303* (2013.01)
(58) Field of Classification Search
USPC .......................................................... 709/224
See application file for complete search history.

(56) References Cited

U.S. PATENT DOCUMENTS

| | | | |
|---|---|---|---|
| 9,332,086 B2 | 5/2016 | Rosewell | |
| 9,350,823 B2 | 5/2016 | Rosewell | |
| 2002/0103881 A1 | 8/2002 | Granade et al. | |
| 2002/0116534 A1 | 8/2002 | Teeple | |
| 2003/0186722 A1 | 10/2003 | Weiner | |
| 2004/0117396 A1 | 6/2004 | Avadhanam et al. | |
| 2006/0101503 A1 | 5/2006 | Venkataraman et al. | |
| 2006/0259498 A1 | 11/2006 | Ellison et al. | |
| 2009/0171953 A1 | 7/2009 | Morris et al. | |
| 2009/0288136 A1 | 11/2009 | Chang et al. | |
| 2010/0192225 A1* | 7/2010 | Ma | G06F 17/30985 726/23 |
| 2012/0130983 A1 | 5/2012 | Ryan et al. | |
| 2012/0317098 A1 | 12/2012 | Okato et al. | |
| 2013/0031072 A1* | 1/2013 | Passani | G06F 17/30905 707/705 |
| 2013/0066898 A1 | 3/2013 | Wu | |
| 2016/0232190 A1 | 8/2016 | Rosewell | |

OTHER PUBLICATIONS

Communication mailed by European Patent Office dated Jun. 24, 2015, in European Application No. 13192291.6-1870 (5 pages).
51Degrees.mobi Limited, "51 Degree.Mobi", 51degrees.mobi/support/Documentation/NET/Summary.aspx, copyright 2010-2013, accessed Dec. 19, 2013, 2 pages.
"Class API", http://docs.deviceatlas.com/apis/enterprise/java1.7/mobi/mtld/da/API.html, copyright 2013, accessed Dec. 19, 2013, 14 pages.
ScientiaMobile Inc., "WURFL-Mobile Device Database", wurfl.sourceforge.net/wurfl_schema.php, Copyright 2012, accessed Dec. 19, 2013, 3 pages.
"MobileESP", http://code.google.com/mobileesp/source/browse/Java/UAgentinfo.java, Copyright 2010-2013, accessed Dec. 19, 2013, 16 pages.
Luca Passani, "Online Contributors Help—ScientiaMobile, Inc.", https://db.scientiamobile.com/static/contributors_help.htm#topdoc, accessed Dec. 19, 2013, 14 pages.
Communication mailed by European Patent Office dated Feb. 20, 2015, in European Application No. 13192291.6-1870 (4 pages).

* cited by examiner

Fig. 6

IDENTIFYING PROPERTIES OF A COMMUNICATION DEVICE

This application is a continuation of application Ser. No. 14/085,223, filed Nov. 20, 2013, now allowed, which claims the benefit of European Application No. EP13192291.6, filed Nov. 11, 2013. Each patent application identified above is incorporated here by reference in its entirety.

The present invention relates to telecommunications. In particular, the present invention relates to identifying the properties of a communication device, and also to generating information for use in identifying the properties of a communication device.

Owners of web sites need to understand the capabilities of client communication devices accessing their web sites in order to optimise the content provided to different device types. For example, a news organisation's web page containing an article will be surrounded by areas highlighting other articles to which the reader can progress. On a mobile phone, a single area listing further articles might be displayed at the top of the page using plain text. On a desktop web browser with its larger screen, multiple areas listing additional articles including thumbnail images could be displayed above and to the right of the article. In both cases, the article's content will be identical. FIG. 1 shows an example layout of a web page on a mobile phone screen, in which content area 1 floats at the top of the page and always remains in view. FIG. 2 shows an example layout of the same web page for a desktop or laptop computer screen, in which two content areas are shown. The web page shown in FIG. 2 is the same as that shown in FIG. 1, but more content has been added to the right of the page in area 2 and area 1 is larger and does not float at the top of the page.

Web site owners also need to include characteristics of client communication devices in analysis of web usage in order to understand if user behaviour varies by device type. For example, analysis of the percentage of people failing to read a second news article by screen size may provide the information needed to improve the user interface on devices that correlate with a higher than average failure to read further news articles.

The Hyper Text Transfer Protocol (HTTP) specification advises client devices to include headers to control how a request to a server should be managed by the server. Example headers include preferred language, cookies containing information about previous requests, the types of media the device can support and information about the device. The most widely used header for the identification of device capabilities is known as a User-Agent. A User-Agent is a string of characters that a communication device can transmit to a remote service, such as a web server. The User-Agent contains information about the properties of a communication device, such as the device's hardware, operating system and web browser. Upon receiving a User-Agent from a particular communication device, the remote service can analyse the User-Agent in order to determine the properties of that device.

Whilst the HTTP specification advises devices to transmit a User-Agent header, it provides no guidance concerning the structure of the character string that the header contains. As a result, a wide variety of User-Agent formats have come to be used.

Table 1 shows some examples of popular User-Agents.

TABLE 1

| Row | Example User-Agent | Explanation |
|---|---|---|
| 1 | Mozilla/5.0 (compatible; MSIE 9.0; Windows NT 6.1; WOW64; Trident/5.0) | Used by Microsoft to identify different versions of Internet Explorer on desktop or laptop devices. |
| 2 | Mozilla/5.0 (compatible; Baiduspider/2.0; +http://www.baidu.com/search/spider.html) | Used by Baidu (China based search engine) to identify its web site crawler. |
| 3 | Mozilla/5.0 (iPhone; CPU iPhone OS 6_1_3 like Mac OS X) AppleWebKit/536.26 (KHTML, like Gecko) Version/6.0 Mobile/10B329 Safari/8536.25 | Used by Apple to identify iPhone type devices. |
| 4 | Mozilla/5.0 (Linux; U; Android 4.0.4; en-us; SPH-D710 Build/IMM76I) AppleWebKit/534.30 (KHTML, like Gecko) Version/4.0 Mobile Safari/534.30 | Used by manufacturers of Android based devices to identify their devices. |

User-Agents do not follow any defined rules and usually only the inclusion of the prefix "Mozilla/5.0" and some information between succeeding brackets can be expected.

Hardware vendors vary the format used within their devices' User-Agents. In the Apple example at Row 3 of Table 1, the type of device can be found by looking at the string immediately following the first bracket. In the case of Row 3 of Table 1, the string is "iPhone" indicating the device is an Apple iPhone. However, the Android example at Row 4 of Table 1 contains a string indicating the device's model number before the string "Build". In the case of Row 4 of Table 1, the string is "SPH-D710" indicating the device is a Samsung Galaxy II. The Baidu search engine example at Row 2 of Table 1 contains no information about the type of device, but instead includes the Uniform Resource Locator (URL) "http://www.baidu.com/search/spider.html".

Some hardware vendors also include serial number information within the User-Agent to uniquely identify a specific communication device. As a result, there is a vast number of User-Agent headers in use today.

To identify the properties of a communication device accessing a web site, two things are required:
1. information about all possible devices, including details of the hardware, operating system and browser information; and
2. a method of relating User-Agents, and other relevant HTTP headers, to entities contained within the information about all possible devices.

Regular Expressions and tries are two methods currently used to achieve the latter requirement.

Regular Expressions (RegExs) are a method of matching patterns within a string of characters. One of the most popular and simple RegExs used by many people is a single asterisk to match any group of characters. For example, when searching for a subset of files in a folder, the RegEx "*.doc" could be entered into a search box to return all files with the filename extension "doc". If only files containing the word "example" are of interest, the RegEx "*example*" might be used.

In Table 1, a RegEx of "*iPhone*" could be used to search for the presence of the characters iPhone within a sequence of characters. If present, the web site could be confident that the requesting device is an iPhone and respond accordingly. Another example is the RegEx "*MSIE 9.0*", which could be used to determine if the device was using the web browser Microsoft Internet Explorer version 9.0.

More complex RegExs can be written which contain conditional logic concerning the relative position within the string of the characters. For example, the RegEx "[^;]+ (?=Build/)" could be used to find any characters following a semi-colon and before the word "Build" followed by a forward slash. This RegEx would be helpful in retrieving the characters relating to the Android device's model in Row 4 of Table 1.

Such RegExs are widely used to identify common and basic characteristics of a device accessing a web site. Open source projects such as DetectMobileBrowsers.com (http://detectmobilebrowsers.com/) use a long list of RegExs to determine if a device is a mobile browser, or a traditional desktop or laptop based browser. However, such solutions require continuous maintenance and miss out important information needed by many web site owners. For example, the presence of the string "Android" within a User-Agent might be sufficient to determine that the requesting device is a mobile phone. Indeed, many web sites currently use this approach. However, the Android operating system is increasingly being used by tablet and laptop devices. As such, more information is needed to differentiate between mobile phones, tablets or laptops using Android. The device information contained in the User-Agent can be used to determine this, but this requires information about all the possible Android devices and their model numbers. Collecting and managing such information is beyond all but a small number of existing designs.

Open source projects which use both complex RegExs combined with a more complete database of devices include WURFL (http://wurfl.sourceforge.net/) and 51Degrees.mobi version 2 (http://51degrees.codeplex.com/). These solutions use complex RegExs to return the relevant parts of a User-Agent and then look up the results in an associated database. Where a precise match cannot be found, a Levenshtein Distance (LD) algorithm is used to find the closest matching record. The Levenshtein Distance between two strings is the minimum number of single-character edits (insertion, removal, substitution) required to change one string into the other. The LD between the two words "patient" and "patent" would be one as the only difference between the words is the removal of the letter "i" from "patient". The LD algorithm can be used to find the closest device in the database. For example, Row 4 in Table 1 contains the string "SPH-D710" to match the device's model. If a new User-Agent, unknown at the time the database of devices was created, contained the string "SPH_D710" (the hyphen being replaced with an underscore) the LD algorithm could be used to determine that SPH-D710 is the closest matching device.

To date RegExs combined with LD algorithms have provided an acceptable solution to overcome the problem of identifying device characteristics from HTTP headers and User-Agents. However, as the number of User-Agents increases, more RegExs and LD calculations need to be executed when a request is received by a web site. The number of User-Agents is now so great that the time taken to execute these RegExs and LD algorithms is longer than web site owners wish to wait for the resulting device characteristics to be provided. For an eCommerce web site where response time is extremely important, it is unacceptable to wait even 5 milliseconds whilst all the available CPU capacity is used to determine the characteristics of the requesting device. To compound this problem, multiple requests will be served in parallel, thus reducing the amount of CPU available to each request, which increases the length of time take to return the devices' characteristics. As the number of User-Agents continues to increase, caching solutions where the result of previous device detections are stored and keyed on the User-Agent are becoming ineffective. A faster solution is required.

Trie data structures can be used to provide considerably faster results as they reduce the number of complex calculations which need to be performed. A trie is a type of tree data structure that is particularly suited for storing character strings. A trie has one node for every common prefix, and the strings are stored in extra leaf nodes. The trie is evaluated from the root node down. Consider the four words "Patient", "Patent", "Petting" and "Petite". If each of these words related to a unique result, one could simply check a test string against each one in turn until precise match is found. However, if one were to store the sequences so that common prefixes were not duplicated, a faster method of determining a result could be used.

TABLE 2

|  | Character Position | | | | | | |
| --- | --- | --- | --- | --- | --- | --- | --- |
| Result | 1 | 2 | 3 | 4 | 5 | 6 | 7 |
| 1 | P | A | T | I | E | N | T |
| 2 |   |   | ↘ | E | N | T |   |
| 3 | ↘ | E | T | T | I | N | G |
| 4 |   |   | ↘ | I | T | E |   |

Table 2 shows the four words over four rows with common prefixes removed. A prefix sequence common to the previous row is indicated using a ↘ symbol. In order to determine the result, one would compare the first character of the target sequence with the first character in the table. If it matched, one could then evaluate the children until either the entire sequence matched perfectly or there were no further characters to evaluate. Using Table 2 with the target sequence "Patents" would match result 2. The word "Pet" would match either of results 3 or 4.

Trie data structures are commonly used for dictionary applications to determine if a word is valid and to suggest alternative words. They work very well in such applications where there are hundreds of thousands of possible results.

When used for device identification, however, tries need to be populated with tens of millions of possible User-Agents in order to maintain the required level of accuracy. As such, tries need to be continually updated to ensure that they are aware of new User-Agents. Consider a new version of Android. Row 4 of Table 1 shows character position 31 as "4". If a new version were to be denoted by "5" at position 31, and not contained within the trie, then multiple results would be returned. At best, this could allow identification that the device is using Android, but could not allow identification of the version or the model number of the device.

Tries for accurate device identification are very large, typically more than several gigabytes. As such they are only suitable for web sites that have a large amount of available storage. They are unsuited to small and medium sized web sites that operate on relatively constrained resources.

RegExs and LD algorithm based solutions work well when storage is constrained, but use a lot of CPU resources to determine a result. Thus, there is a need to provide a fast and accurate way to identify communication devices.

SUMMARY OF THE INVENTION

A first aspect of the invention provides a method of generating information for use in identifying a property of a communication device, the method comprising: receiving training data comprising a character string that identifies the communication device; identifying one or more substrings within the character string; determining a character position at which each identified substring occurs within the character string; adding an entry for each identified substring to a respective one of a plurality of data structures, each of the plurality of data structures being designated for storing substrings that occur at a particular character position, wherein each entry comprises an identified substring and is added to the data structure designated for storing substrings that occur at the character position at which that substring occurs; associating each entry with a profile, wherein the profile includes a value of at least one property of the communication device; and storing the plurality of data structures and data representing the association between each entry and its associated profile.

Associating each entry with a profile may comprise: defining a signature that identifies the communication device, wherein the signature comprises a reference to each of the entries that were added to the plurality of data structures; and associating the signature with one or more profiles. Storing data representing the association between each entry and its associated profile may comprise: storing the signature; and storing data representing the association between the signature and the one or more profiles. Each entry may further comprise a unique identifier, and wherein defining a signature that identifies the communication device comprises combining the unique identifiers of each of the entries that were added to the data structures.

Identifying one or more substrings within the character string may comprises evaluating a regular expression against the character string to identify a substring that matches the regular expression. The method may further comprise storing an array of characters comprising all identified substrings at their respective character positions, wherein the array does not include characters of the character string that were not matched by the regular expression.

The plurality of data structures may comprise a plurality of trie data structures. Adding an entry for each identified substring to a respective one of a plurality of data structures may comprise: adding the last character of the identified substring to a first branch node of a trie data structure, the first branch node being adjacent the root node of the trie data structure; and adding the first character of the identified substring to a leaf node of the trie data structure. The plurality of data structures may further comprise a table comprising at least one row, wherein a plurality of nodes of the trie data structures each reference a common row of the table, and wherein the row comprises a portion of a substring that is common to a plurality of character strings that are represented by the plurality of nodes.

The training data may further comprise: a plurality of character strings, each character string comprising one or more substrings, wherein each character string identifies a respective one of a plurality of communication devices; a plurality of regular expressions, wherein each regular expression matches one of the substrings when evaluated; a plurality of profiles, wherein each regular expression is associated with a profile; and data representing the association between each regular expression and its associated profile. The plurality of communication devices may be a representative sample of a population of communication devices that was in use over a period of time. The method may further comprise generating a representative sample of a population of communication devices by: analysing log data to count the number of occurrences of each of a number of character strings over the period of time, wherein each of said number of character strings identifies a respective communication device in the population of communication devices; and adding devices identified by the most frequently occurring character strings to the representative sample of the population of communication devices.

A further aspect of the invention provides a method of identifying a property of a communication device, the method comprising: receiving a character string that identifies the communication device, the character string comprising one or more substrings; searching for each of the one of more substrings in a plurality of data structures, each of the plurality of data structures being designated for storing substrings that occur at a particular character position of a character string, wherein each data structure comprises one or more entries, wherein each entry comprises a substring and is associated with a respective profile, wherein each profile includes a value of at least one property of the communication device; and retrieving the profile associated with each substring that is found by said searching.

Searching for each of the one of more substrings may comprise iteratively comparing the contents of the character string at a particular character position to the data structure designated for storing substrings that occur at that character position, until a data structure comprising an entry identical to a portion of the character string is found. Iteratively comparing the contents of the character string at a particular character position to the data structure designated for storing substrings that occur at that character position may comprise: reading a character from the character string; selecting one of the plurality of data structures, wherein the selected data structure is the data structure designated for storing substrings that occur at the character position from which the character was read; and comparing the character read from the character string to the character in the first character position of each of the substrings stored in the entries of the selected data structure. If the character read from the character string is identical to the character in the first character position of one or more substrings stored in the entries of the selected data structure, the method may further comprise: reading a next character from the character string; comparing the next character read from the character string to the character in the next character position of the one or more substrings stored in the entries of the selected data structure; and repeating the steps of reading a next character and comparing the next character, until an entry identical to a portion of the character string is found. If the character read from the character string is not identical to the character in the first character position of any of the substrings stored in the entries of the selected data structure, the method may further comprise: reading a next character from the character string; selecting another one of the plurality of data structures, wherein the selected data structure is the data structure designated for storing substrings that occur at the character position from which the next character was read; and comparing the next character to the character in the first character position of each of the substrings stored in the entries of the selected data structure.

Each entry in the data structure may further comprise a unique identifier, and the method may further comprise generating a signature for the communication device by combining the unique identifiers of each of the entries that were located by the step of searching. The method may further comprise: comparing the signature for the communication device with a data structure comprising signatures of previously-identified communication devices, wherein each entry in the data structure comprising signatures of previously-identified communication devices further comprises a reference to one of more profiles for a previously-identified communication device; and if the signature for the communication device is identical to the signature of a previously-identified communication device, using the reference to retrieve the one of more profiles of the previously-identified communication device.

The method may further comprise comparing one or more substrings found by said searching with one or more substrings stored in the entries of the plurality of data structures, to locate a signature of a previously-identified communication device that most closely matches the communication device. The signature of the previously-identified communication device that most closely matches the communication device can comprise a reference to one of more profiles for the previously-identified communication device. Upon locating the signature of the previously-identified communication device that most closely matches the communication device, the reference can be used to retrieve the one of more profiles of the previously-identified communication device. Comparing one or more substrings may comprise calculating the difference between the ASCII values of respective characters in the substrings. Alternatively or additionally, comparing one or more substrings may comprise identifying sequences of characters which form numeric values, and calculating the difference between the numeric values. In either case, the previously-identified communication device whose substrings are the least different to the substrings of the communication device is assumed to be the most closely-matching communication device.

A further aspect of the invention provides a computer-readable medium comprising instructions which, when executed by a computer, cause the computer to perform a method as described herein.

A further aspect of the invention provides a computer-readable medium comprising information for use in identifying a property of a communication device, the communication device being arranged to transmit a character string that identifies the communication device, the character string comprising one or more substrings, wherein the information comprises: a plurality of data structures, each of the plurality of data structures being designated for storing substrings that occur at a particular character position in the character string, wherein each data structure comprises one or more entries, each entry comprising a substring; and data representing an association between each entry and a respective profile, wherein each profile includes a value of at least one property of the communication device.

The information may further comprise one or more profiles. The information may further comprises: a signature that identifies the communication device, wherein the signature comprises a reference to one or more entries in the plurality of data structures; and data representing an association between the signature and one or more profiles. Each entry may further comprise a unique identifier, and the signature may comprise a combination of the unique identifiers of one or more entries in the plurality of data structures. The plurality of data structures may comprise a plurality of trie data structures. The last character of a substring may be stored in a first branch node of a trie data structure, the first branch node being adjacent the root node of the trie data structure; and the first character of the substring may be stored in a leaf node of the trie data structure.

The plurality of data structures can further comprise a table comprising at least one row, wherein a plurality of nodes of the trie data structures each reference a common row of the table, and wherein the row comprises a portion of a substring that is common to a plurality of character strings that are represented by the plurality of nodes.

A further aspect of the invention provides an apparatus for generating information for use in identifying a property of a communication device, the apparatus comprising: means for receiving training data comprising a character string that identifies the communication device; means for identifying one or more substrings within the character string; means for determining a character position at which each identified substring occurs within the character string; means for adding an entry for each identified substring to a respective one of a plurality of data structures, each of the plurality of data structures being designated for storing substrings that occur at a particular character position, wherein each entry comprises an identified substring and is added to the data structure designated for storing substrings that occur at the character position at which that substring occurs; means for associating each entry with a profile, wherein the profile includes a value of at least one property of the communication device; and means for storing the plurality of data structures and data representing the association between each entry and its associated profile.

The means for associating each entry with a profile may comprise: means for defining a signature that identifies the communication device, wherein the signature comprises a reference to each of the entries that were added to the plurality of data structures; and means for associating the signature with one or more profiles. The means for storing may comprise: means for storing the signature; and means for storing data representing the association between the signature and the one or more profiles. Each entry may further comprises a unique identifier, and the means for defining a signature that identifies the communication device may comprise means for combining the unique identifiers of each of the entries that were added to the data structures.

The means for identifying one or more substrings within the character string may comprise: means for evaluating a regular expression against the character string to identify a substring that matches the regular expression. The apparatus may further comprise means for storing an array of characters comprising all identified substrings at their respective character positions, wherein the array does not include characters of the character string that were not matched by the regular expression.

The plurality of data structures may comprise a plurality of trie data structures. The means for adding an entry for each identified substring to a respective one of a plurality of data structures may comprise: means for adding the last character of the identified substring to a first branch node of a trie data structure, the first branch node being adjacent the root node of the trie data structure; and means for adding the first character of the identified substring to a leaf node of the trie data structure. The plurality of data structures may further comprise a table comprising at least one row, wherein a plurality of nodes of the trie data structures each reference a common row of the table, and the row may comprise a portion of a substring that is common to a plurality of character strings that are represented by the plurality of nodes.

The apparatus may further comprise means for generating a representative sample of a population of communication devices by: analysing log data to count the number of occurrences of each of a number of character strings over the period of time, wherein each of said number of character strings identifies a respective communication device in the population of communication devices; and adding devices identified by the most frequently occurring character strings to the representative sample of the population of communication devices.

A further aspect of the invention provides a method for identifying a property of a communication device, the apparatus comprising: means for receiving a character string that identifies the communication device, the character string comprising one or more substrings; means for searching for each of the one of more substrings in a plurality of data structures, each of the plurality of data structures being designated for storing substrings that occur at a particular character position of a character string, wherein each data structure comprises one or more entries, wherein each entry comprises a substring and is associated with a respective profile, wherein each profile includes a value of at least one property of the communication device; and means for retrieving the profile associated with each substring that is found by said searching.

The means for searching for each of the one of more substrings may comprise means for iteratively comparing the contents of the character string at a particular character position to the data structure designated for storing substrings that occur at that character position, until a data structure comprising an entry identical to a portion of the character string is found. The means for iteratively comparing the contents of the character string at a particular character position to the data structure designated for storing substrings that occur at that character position may comprise: means for reading a character from the character string; means for selecting one of the plurality of data structures, wherein the selected data structure is the data structure designated for storing substrings that occur at the character position from which the character was read; and means for comparing the character read from the character string to the character in the first character position of each of the substrings stored in the entries of the selected data structure.

If the character read from the character string is identical to the character in the first character position of one or more substrings stored in the entries of the selected data structure, the apparatus may be configured to: read a next character from the character string; compare the next character read from the character string to the character in the next character position of the one or more substrings stored in the entries of the selected data structure; and repeat the steps of reading a next character and comparing the next character, until an entry identical to a portion of the character string is found.

If the character read from the character string is not identical to the character in the first character position of any of the substrings stored in the entries of the selected data structure, the apparatus may be configured to: read a next character from the character string; select another one of the plurality of data structures, wherein the selected data structure is the data structure designated for storing substrings that occur at the character position from which the next character was read; and compare the next character to the character in the first character position of each of the substrings stored in the entries of the selected data structure.

Each entry in the data structure may further comprise a unique identifier, and the apparatus may further comprise means for generating a signature for the communication device by combining the unique identifiers of each of the entries that were located by the step of searching. The apparatus may further comprise: means for comparing the signature for the communication device with a data structure comprising signatures of previously-identified communication devices, wherein each entry in the data structure comprising signatures of previously-identified communication devices further comprises a reference to one of more profiles for a previously-identified communication device; and if the signature for the communication device is identical to the signature of a previously-identified communication device, means for retrieving the one or more profiles of the previously-identified communication device using the reference.

The apparatus may further comprise means for comparing one or more substrings found by said searching with one or more substrings stored in the entries of the plurality of data structures, to locate a signature of a previously-identified communication device that most closely matches the communication device.

BRIEF DESCRIPTION OF THE DRAWINGS

Preferred features of the invention will now be described, purely by way of example, with reference to the accompanying drawings in which:

FIG. 6 shows a user interface used to relate profiles to User-Agents via RegExs;

DETAILED DESCRIPTION

Disclosed herein are interrelated methods and apparatuses that enable the properties of a communication device to be identified. Firstly, there is a method and apparatus for generating information for use in identifying the properties of a communication device. Secondly, there is a method and apparatus for identifying the properties of a communication device based on the previously-generated information.

Figures 4, 5:
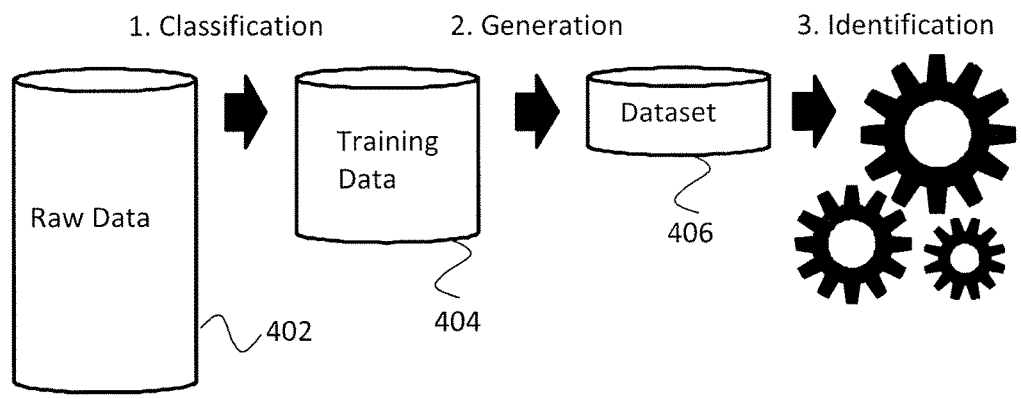
FIG. 4 is a flow diagram of the conversion of the classification, generation and identification processes described herein.
FIG. 5 shows a user interface used to create profiles for different components of a communication device.

The relationship between these methods is illustrated by the flow diagram of FIG. 4. The initial input to these methods is raw data 402. Two different types of raw data 402 are used:

1. information about the characteristics of all possible hardware, operating systems and web browsers and their related User-Agents; and
2. a representative sample of historic User-Agents and their relative popularity. Historic User-Agent data could be obtained from web site log files or via Internet Service Provider (ISP) traffic monitoring.

These two types of raw data 402 are combined to form training data 404, in a process that is referred to herein as "Classification". The training data 404 is then converted into a dataset 406, in a process that is referred to herein as "Generation". The dataset 406 can then be deployed to a remote service, such as a web site. The remote service can use the dataset 406 to identify the properties of communication devices, in a process that is referred to herein as "Identification". These processes will now be described.

Classification

Every device using HTTP communications can be considered to have three components, namely a hardware component, an operating system component and a browser component. Over time other components may be required, or current ones may become obsolete. Example components are shown in Table 3.

TABLE 3

| ID | Component Type | Description |
|---|---|---|
| C1 | Hardware | A collection of properties associated with the device hardware. For example, physical screen size, input methods, manufacturer. |
| C2 | Operating System | A collection of properties associated with the device's operating system. For example, version, supported executable formats, or manufacturer. |
| C3 | Browser | A collection of properties associated with the device's web browser. For example, supported HTML5 elements, supported image, audio and video formats. |

Each component is associated with one or more profiles. A profile groups together related characteristics of a component. Example profiles are shown in Table 4, Table 5 and Table 6. Specifically, Table 4 shows examples of hardware profiles that group together characterises of a hardware component, Table 5 shows examples of operating system profiles that group together characteristics of an operating system component, and Table 6 shows examples of browser profiles that group together characteristics of a browser component.

TABLE 4

| ID | C1 - Hardware Profiles |
|---|---|
| H1 | Apple iPhone |
| H2 | Apple iPad |
| H3 | Samsung Galaxy 4 |
| H4 | Samsung Galaxy Nexus |
| H5 | HTC One X |
| H6 | Nokia Lumia 800 |

TABLE 4-continued

| ID | C1 - Hardware Profiles |
|---|---|
| H7 | Unknown Desktop |
| H8 | Unknown |

TABLE 5

| ID | C2 - Operating System Profiles |
|---|---|
| O1 | iOS version 4 |
| O2 | iOS version 5 |
| O3 | Android 2 |
| O4 | Android 4 |
| O5 | Windows Phone 7.5 |
| O6 | Windows Phone 7.8 |
| O7 | Windows 8 |
| O8 | Unknown |

TABLE 6

| ID | C3 - Browser Profiles |
|---|---|
| B1 | Mobile Safari |
| B2 | Android Browser |
| B3 | Opera Mobi |
| B4 | Firefox |
| B5 | Internet Explorer |
| B6 | Chrome Desktop |
| B7 | Chrome Mobile |
| B8 | Spider/Crawler |

Each profile includes one or more properties. For example, a device's physical screen size, CPU, hardware vendor and model name are properties related to the hardware component. An operating system component may include properties such as information about the manufacturer, the version, when it was released and the Application Programming Interfaces (APIs) it makes available. Table 7 shows examples of hardware vendors.

TABLE 7

| ID | Value |
|---|---|
| V1 | Samsung |
| V2 | Nokia |
| V3 | LG |
| V4 | Apple |

Many of these values will be repeated across multiple profiles. For example, Samsung manufacture many different devices. Rather than duplicating the value "Samsung" multiple times for each profile, the profile can reference a unique ID for the value. Table 8 shows some example hardware property values assigned to profiles H3 and H4. Notice how value ID V1 relates to both profiles.

TABLE 8

| ID | Property | Value | Profile ID |
|---|---|---|---|
| V10 | CPU | 1.6 GHz quad-core | H3 |
| V9 | ScreenDiagonalInches | 5.0 | H3 |
| V8 | HardwareModel | Galaxy 4 | H3 |
| V1 | HardwareVendor | Samsung | H3 |
| V7 | CPU | 1.2 Ghz Dual-core | H4 |
| V6 | ScreenDiagonalInches | 4.65 | H4 |
| V5 | HardwareModel | Galaxy Nexus | H4 |
| V1 | HardwareVendor | Samsung | H4 |

FIG. 5 shows an example of a user interface to enable a human operator to populate profile data based on sources including manufacturers' specifications and automated device tests. The user interface allows values to be selected from predetermined lists, thus increasing data consistency by reducing the probability of operator error.

In order to relate profiles to User-Agents, each profile has one or more RegExs assigned to it by a human operator. For each new User-Agent being added to the training data, the RegExs for all of the profiles for each component are evaluated. If a single profile matches the User-Agent being added, that User-Agent can be automatically related to the profile. Table 9 shows an example of related profiles and User-Agents assigned in this manner.

TABLE 9

| ID | User-Agent Example | Matching Profiles | Matched Rules/Regex |
|---|---|---|---|
| U1 | Mozilla/5.0 (Windows; U; Windows NT 6.2; en-US; rv:1.9.0.1) Gecko/2008070208 Firefox/3.0.1 | H7-O7-B4 | H-Contains "Windows NT 6.2" O-Contains "Windows NT 6.2" B-Contains "Firefox/3" and no other browser indicator |
| U2 | Mozilia/5.0 (Windows; U; Windows NT 6.2; MSIE 9; en-US; rv:1.9.0.1) | H7-O7-B5 | H-Contains "Windows NT 6.2" O-Contains "Windows NT 6.2" B-Contains "MSIE 9" and no other browser indicator |
| U3 | Mozilla/5.0 (compatible; Googlebot/2.1; +http://www.google.com/bot.html) | H8-O7-B8 | H-Does not match any other Hardware profile O-Does not match any other OS profile B-Contains "Googlebot" |
| U4 | Mozilla/5.0 (Linux; Android 4.0.4; Galaxy Nexus Build/IMM76B) AppleWebKit/535.19 (KHTML, like Gecko) Chrome/18.0.1025.133 Mobile Safari/535.19 | H4-O4-B7 | H-Contains "Galaxy Nexus" after a; and before "Build" O-Contains "Android 4" B-Contains "Chrome/18" |
| U5 | Mozilla/5.0 (iPhone; U; CPU OS 3_2 like Mac OS X; en-us) AppleWebKit/531.21.10 (KHTML, like Gecko) Version/4.0.4 Mobile/7B334b Safari/531.21.10 | H1-O1-B1 | H-Contains "iPhone" after the first (O-Contains "iPhone" and "Version/4" B-Contains "Safari/531" |
| U6 | Mozilla/5.0 (Linux; Android 4.0.4; GT-I9505 Build/IMM76B) AppleWebKit/535.19 (KHTML, like Gecko) Chrome/18.0.1025.133 Mobile Safari/535.19 | H3-O4-B7 | H-Contains "GT-I9505" after a; and before "Build" O-Contains "Android 4" B-Contains "Chrome/18" |
| U7 | Mozilla/5.0 (Linux; Android 4.0.4; GT-I9505 Build/IMM76B) AppleWebKit/535.19 (KHTML, like Gecko) Chrome/18.0.1025.136 Mobile Safari/535.19 | H3-O4-B7 | H-Contains "GT-I9505" after a; and before "Build" O-Contains "Android 4" B-Contains "Chrome/18" |

If no profiles match, or more than one profile matches, then the human operator can be informed. The operator can decide which of the possible profiles to assign the user agent to, or create a new profile if one did not exist already. Additional information may be required from the manufacturer in order to complete the final assignment. This is illustrated in Table 10.

TABLE 10

| ID | User-Agent Example | Matching Profiles |
|---|---|---|
| U8 | Mozilla/5.0 (Windows; U; Windows NT 6.2; MSIE 9; en-US; rv:1.9.0.1) Gecko/2008070208 Firefox/3.0.1 | Multiple profiles matched as B5-Contains "MSIE 9" and B4-Contains "Firefox/3". The operator would need to decide which one was correct by seeking further information. |

TABLE 10-continued

| ID | User-Agent Example | Matching Profiles |
|---|---|---|
| U9 | Mozilla/5.0 (Linux; Android 4.0.4; GalaxyNexus Build/IMM76B) AppleWebKit/535.19 (KHTML, like Gecko) Chrome/18.0.1025.133 Mobile Safari/535.19 | No matching hardware profile as no space between "Galaxy" and "Nexus". The Galaxy Nexus profile's RegExs would need to be altered to check for "GalaxyNexus" without a space. |
| U10 | Mozilla/5.0 (Linux; Android 4.0.4; GT-I9507 Build/IMM76B) AppleWebKit/535.19 (KHTML, like Gecko) Chrome/18.0.1025.133 Mobile Safari/535.19 | GT-I9507 not related to any hardware profile. A new profile will need to be added in consultation with Samsung. |

Figure 6:
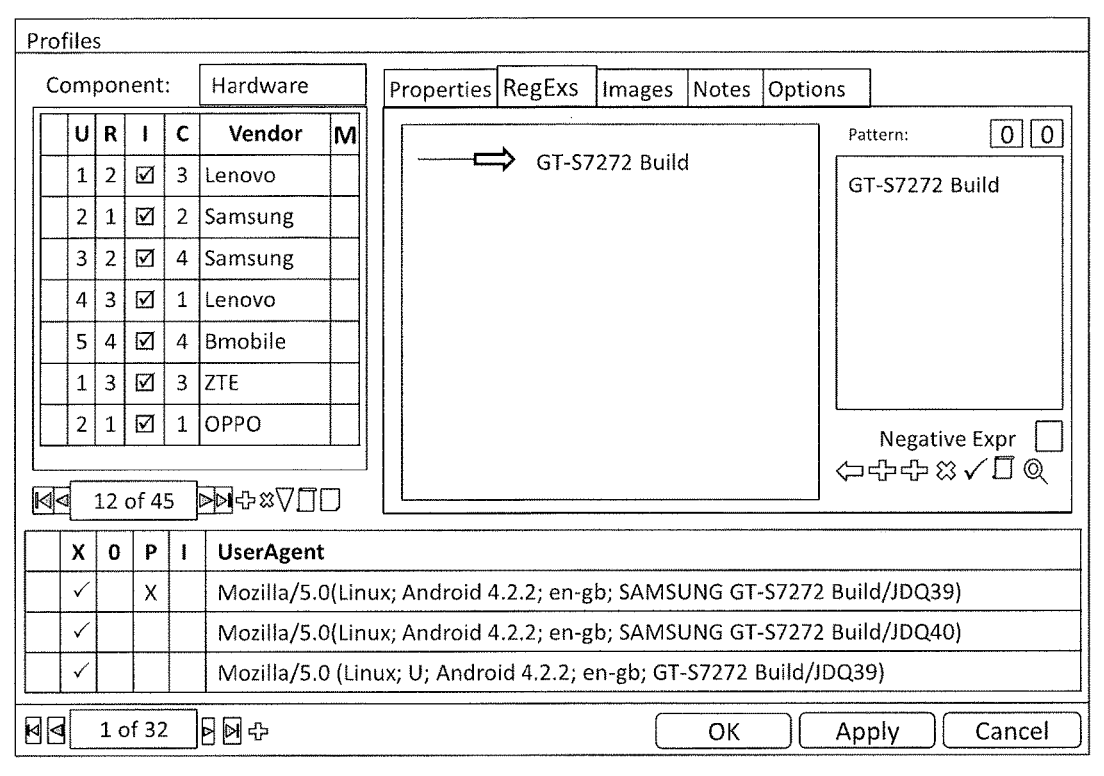

FIG. 6 shows a user interface to control the RegExs related to a specific profile, and the User-Agents related to that profile. RegExs can be created and edited for the profile. The RegExs can then be applied to the possible User-Agents and any that match uniquely assigned to the profile forming a relationship between the Profile and the User-Agent.

Figure 7:
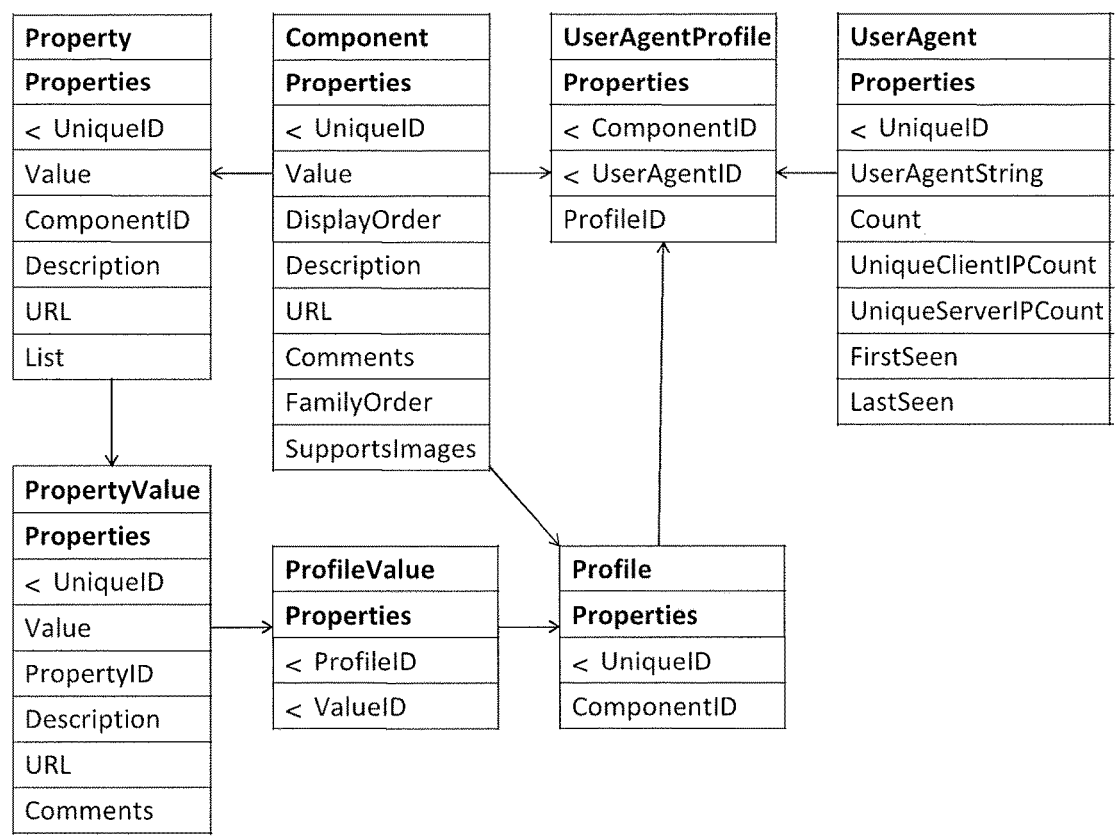
FIG. 7 shows a data structure used to form training data.

FIG. 7 shows an entity model for all the data types and relationships used.

The number of times a User-Agent has been used to visit real web sites can be used to determine which User-Agents are currently relevant. Table 11 shows statistics for the sample set of User-Agents initially shown in Table 9.

TABLE 11

| ID | User-Agent | First Seen | Last Seen | Total |
|---|---|---|---|---|
| U1 | ... Windows NT 6.2 ... | Feb. 15, 2010 | Aug. 1, 2013 | 23,454,878 |
| U2 | ... Windows NT 6.2; MSIE 9 ... | Jun. 3, 2011 | Aug. 1, 2013 | 45,234,756 |
| U3 | ... Googlebot/2.1 ... | Feb. 4, 2003 | Aug. 1, 2013 | 90,123,984 |
| U4 | ... Android 4.0.4; Galaxy Nexus ... | Oct. 23, 2009 | Jun. 5, 2012 | 0 |
| U5 | ... iPhone; ... | Mar. 23, 2008 | Aug. 1, 2013 | 14,762,349 |

Totals only include activity over a given time period. Table 11 shows totals over one year and was produced on 1 Aug. 2013. Row U4 in Table 11 has not been seen since May 6, 2012 and no totals are shown. This information can be used to automatically remove User-Agents that are no longer being used in the real world from the training data 404. This reduces the size of the training data 404, which in turn reduces the size of the dataset 406, thus allowing the dataset to be deployed to websites with limited data storage.

The first seen and last seen information assists the operator in understanding more about the User-Agent and its probability of being important when deciding how the User-Agent should be represented in the training dataset. For example, a User-Agent with a high count but was only seen on a single day would be considered suspicious. Other information such as the number of communication devices using the User-Agent, or servers receiving the User-Agent can be considered.

Generation

Figure 1:
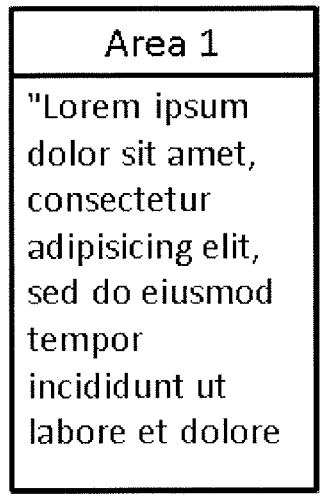
FIG. 1 shows an example of a web page formatted for a mobile phone screen.
Figure 2:
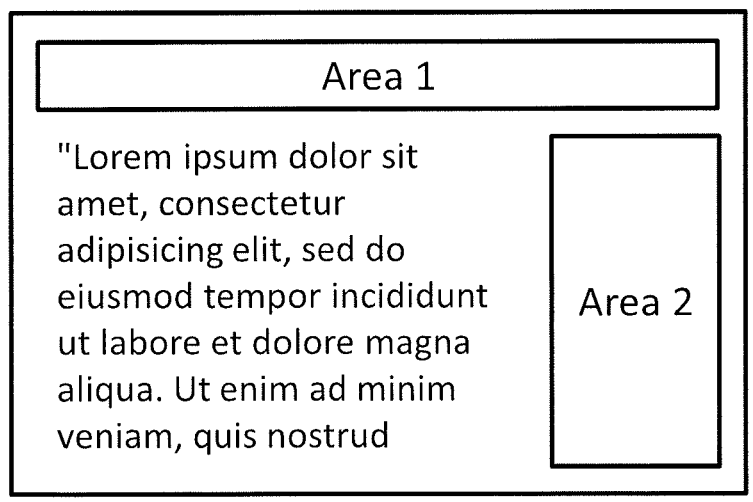
FIG. 2 shows an example of a web page formatted for a desktop screen.
Figure 3:
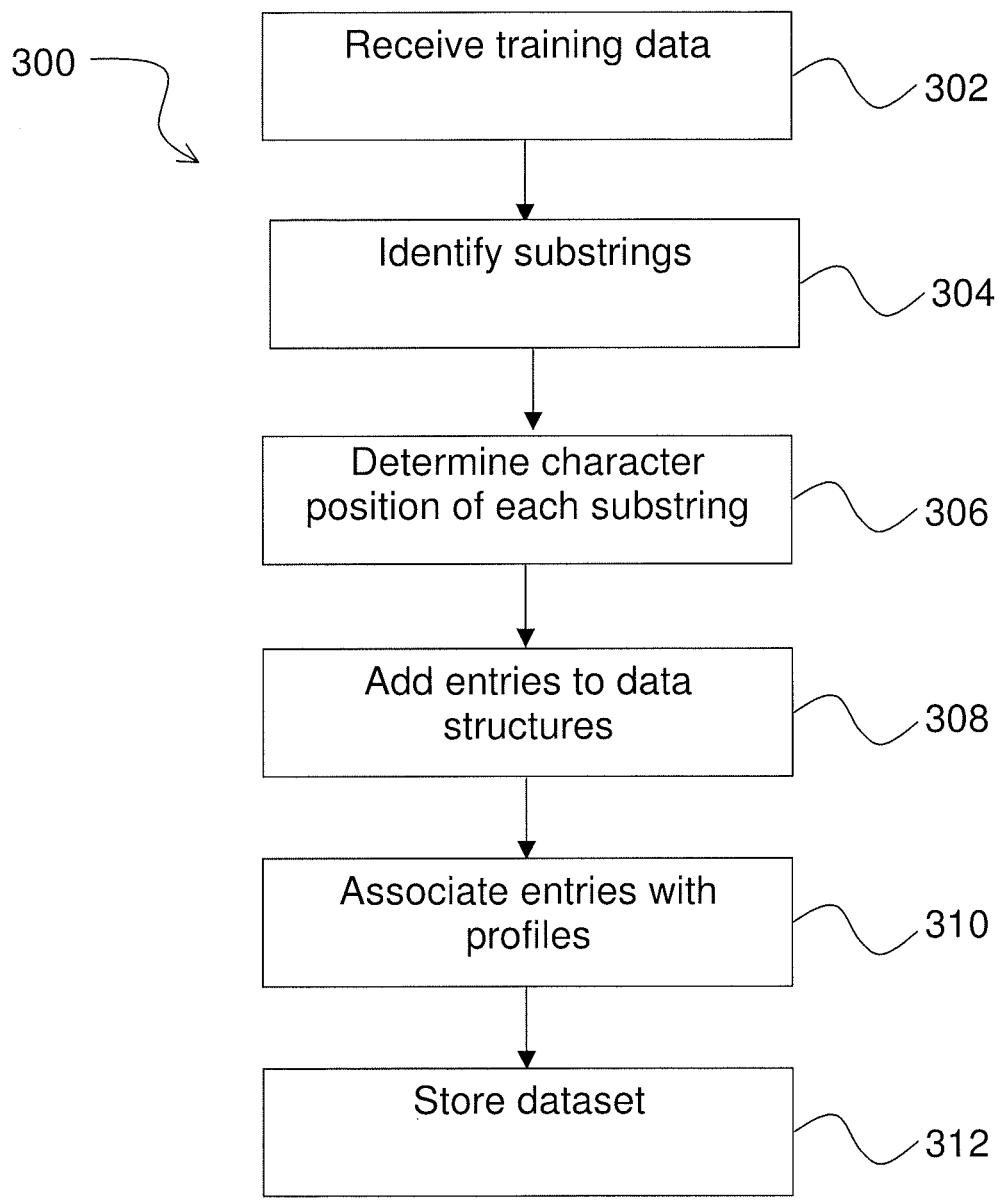
FIG. 3 is a flow diagram of a method of generating information for use in identifying a property of a communication device.

With the training data 404 populated with a sufficiently comprehensive set of User-Agents and profiles, a dataset 406 structured for rapid device identification can be generated. FIG. 3 is a flow diagram of a method 300 of generating such a dataset 406, which information for use in identifying a property of a communication device. Broadly speaking, the method 300 converts the training data 404 into a form that allows the properties of communication devices to be quickly and accurately identified. The method 300 begins at step 302, when training data is received.

Many of the characters contained in a User-Agent are not relevant to the task of device identification. The RegExs to identify relevant parts have been defined by a human operator for each profile using the user interface shown in FIG. 6 and the processes described earlier.

Creating the dataset 406 involves processing each User-Agent in the training data 404 in turn. Initially, an empty array of zero-value ASCII character arrays is created (i.e. an array of arrays). All the possible RegExs are then applied to a User-Agent. Any character and their relative positions which resulted in a match are set in this array and thus become non-zero ASCII character values. Any of the elements of the array that did not match remain set at zero. If the relevant characters have not been generated from a previous User-Agent, they are stored as a unique character array.

Any consecutive sequence of non-zero ASCII character values within the character array is termed a substring. The character array provides information related to both character position and the characters which form the substring. Thus, by applying RegExs to a User-Agent in the training data 404, each substring in the User-Agent is identified, as illustrated by step 304 in FIG. 3. It will be appreciated that the number of substrings that are identified will depend upon the contents of the User-Agent. For example, the User-Agent in Row U3 of Table 9 contains just one identifiable substring, whereas the User-Agents in the other rows of Table 9 contain three identifiable substrings. Hence, one or more substrings can be identified at step 304. Furthermore, applying RegExs to a User-Agent in the training data 404 also allows the character position of each substring to be determined, as illustrated by step 306 in FIG. 3.

Each character array of non-zero ASCII characters is referred to herein as a pattern. Each pattern comprises the substrings stored at their respective character positions. Thus, a pattern is a unique identifier for a communication device or a class of similar communication devices.

Row U4 in Table 12 shows a complete User-Agent. Row P1 in Table 12 shows a pattern comprising the three substrings identified by RegExs. "Android 4.0.4" starts at position 21, "Galaxy Nexus" at position 36 and "Chrome/18" at position 102.

The ↵ symbol in the far right hand column of Table 12, Table 13 and Table 14 indicates that the sequence of characters has wrapped around. The position of the characters shown using fixed width font relate to the position of the substring within the pattern. The underlined spaces are irrelevant or zero-value ASCII characters in the pattern.

TABLE 12

| | | |
|---|---|---|
| U4 | Mozilla/5.0 (Linux; Android 4.0.4; Galaxy Nexus | ↵ |
| | Build/IMM76B) AppleWebKit/535.19 (KHTML, like Gecko) | ↵ |
| | Chrome/18.0.1025.133 Mobile Safari/535.19 | |
| P1 | _____Android 4.0.4__Galaxy Nexus | ↵ |
| | _____ | ↵ |
| | Chrome/18_____ | |

A similar User-Agent string to that shown in Table 12 is shown in Table 13. Row P2 of Table 13 includes "Android 4.0.4" starting at position 21. Pattern P1 from Table 12 also contains the same substring at position 21. However the substring "GT-I9505" appears at position 36 and "Chrome/18" at position 98. Whilst one of the substrings of patterns P1 and P2 is identical ("Android 4.0.4"), the other patterns are different. Patterns P1 and P2 are, therefore, separate unique identifiers.

TABLE 13

| | | |
|---|---|---|
| U6 | Mozilla/5.0 (Linux; Android 4.0.4; GT-I9505 | ↵ |
| | Build/IMM76B) AppleWebKit/535.19 (KHTML, like Gecko) | ↵ |
| | Chrome/18.0.1025.133 Mobile Safari/535.19 | |
| P2 | _____Android 4.0.4__GT-I9505_____ | ↵ |
| | _____ | ↵ |
| | Chrome/18_____ | |

Row U7 of Table 14 shows a User-Agent that is almost identical to U6 of Table 13. The only difference is the final character of the full Chrome version number. U6 contains "Chrome/18.0.1025.133", whilst U7 "Chrome/18.0.1025.136". In this example, the RegExs used to determine the relevant characters of a User-Agent only consider the digits immediately following "Chrome/" and not those after the decimal point. Therefore, the difference in the final character is not relevant and as a result these two User-Agents share the same unique pattern.

TABLE 14

| | | |
|---|---|---|
| U7 | Mozilla/5.0 (Linux; Android 4.0.4; GT-I9505 | ↵ |
| | Build/IMM76B) AppleWebKit/535.19 (KHTML, like Gecko) | ↵ |
| | Chrome/18.0.1025.136 Mobile Safari/535.19 | |
| P2 | _____Android 4.0.4__GT-I9505_____ | ↵ |
| | _____ | ↵ |
| | Chrome/18_____ | |

This technique to eliminate the unnecessary parts of a User-Agent significantly reduces the number of patterns and/or signatures which need to be checked during identification, as described below.

Every pattern maps to a unique profile from each component. The profiles are determined from those related to the populating user agents. Table 15 relates patterns P1 and P2 to the profiles show previously in Table 4, Table 5 and Table 6.

TABLE 15

| Pattern | Hardware | Operating System | Browser |
|---|---|---|---|
| P1 | H4 | O4 | B7 |
| P2 | H3 | O4 | B7 |

If multiple profile combinations are found for the same pattern, the pattern will be rejected and added to a queue for a human operator to resolve at some time in the future.

Once a unique pattern has been identified, a method is needed to rapidly relate a target User-Agent to that pattern for the purpose of identifying the device to which the target User-Agent belongs. This is achieved by adding an entry for each of the substrings that constitute the pattern to a respective data structure, as illustrated by step 308 in FIG. 3. A plurality of data structures are created, and each data structure is designated for storing character strings that occur at a particular character position. For example, a first data structure can be designated for storing substrings that begin at the first character position of a User-Agent, a second data structure can be designated for storing substrings that begin at the second character position of a User-Agent, and so on. Alternatively, a first data structure can be designated for storing substrings that end at the first character position of a User-Agent, a second data structure can be designated for storing substrings that end at the second character position of a User-Agent, and so on. Providing a separate data structure for each character position reduces the time taken to search for a particular substring when identifying a communication device. The data structures are preferably trie data structures. These data structures are populated with each of the substrings that constitute each of the User-Agents in the training data 404, as explained below with reference to Tables 16 to 19.

The greatest statistical variance between substrings occurs towards the right hand side of the substring. Therefore, structuring a trie from the last character to the first reduces the number of characters that need to be checked before a difference is identified. Consider the substring "Android" followed by numbers and decimal points. This substring will often start at position 21 of a User-Agent from an Android based device. The numeric values that follow "Android" are most significant. Checking the numeric values first will result in a failure more rapidly than checking the initial characters, which will be commonly found in many User-Agents. Therefore, working with substrings from the last character position to the first character position reduces the number of characters that need to be compared needlessly, thus reducing the time and computational resources required to identify a device.

In the following description, substrings are shown in the reverse order to that in which they occur in the User-Agent, so as to reflect the preferred embodiments in which the substrings are processed from the last character position to the first character position. However, it will be appreciated that substrings could alternatively be processed in the same order as they occur in the User-Agent (i.e. from the first character position to the last character position), although this would not be as computationally efficient.

Table 16 contains four relevant parts of User-Agents, which all end at character position 33. Character position 33 can contain either a "4" or "5", as shown in rows 1 and 3. At character position 29 a branch is formed as either a "4" or "3" can be contained there. Character positions 28 to 21 are identical in all four cases.

TABLE 16

| Position | — | 33 | 32 | 31 | 30 | 29 | 28 | 27 | 26 | 25 | 24 | 23 | 22 | 21 | ID |
|---|---|---|---|---|---|---|---|---|---|---|---|---|---|---|---|
| Row 1 | ↘ | 4 | • | 0 | • | 4 |   | d | i | o | r | d | n | A | N1 |
| Row 2 |   |   |   |   | ↘ | 3 |   | d | i | o | r | d | n | A | N2 |
| Row 3 | ↘ | 5 | • | 0 | • | 4 |   | d | i | o | r | d | n | A | N3 |
| Row 4 |   |   |   |   | ↘ | 3 |   | d | i | o | r | d | n | A | N4 |

In each case, a unique identifier for the substring formed by the preceding nodes of the trie is shown in the "ID" column of Table 16. The unique identifiers of substrings are referred to as "substring IDs" and are denoted with the prefix N throughout this description. Therefore, the reversed string "4.0.4 diordnA" relates to substring ID N1 in Table 16.

Where a string contained in the trie is part of another string and they share the same prefix, a method is needed to differentiate one from the other. Consider the strings "Android 4.0.4" and "droid 4.0.4" where both end at character position 33. The first string contains two extra characters, "An". Both strings are valid at that character position. The trie is structured so that a branch can occur and so that both strings can be identified. Table 17 shows the resulting trie structure, where Row 1 ends at position 23. If the characters of Row 1 of Table 17 are present and the characters "nA" do not appear afterwards then substring ID N5 would be the substring found.

TABLE 17

| Position | — | 33 | 32 | 31 | 30 | 29 | 28 | 27 | 26 | 25 | 24 | 23 | 22 | 21 | ID |
|---|---|---|---|---|---|---|---|---|---|---|---|---|---|---|---|
| Row 1 | ↘ | 4 | • | 0 | • | 4 |   | d | i | o | r | d |   |   | N5 |
| Row 2 |   |   |   |   |   |   |   |   |   |   |   |   | ↘ | n | A | N6 |

In practice, many of the character sequences used in the trie data structure are duplicates. For example, the characters "diordnA" in Table 16 are contained in all four rows. By enhancing the physical data structure further this duplication is removed. Common sequences of characters are stored in a separate table and referenced from nodes of the trie. Rather than the node relating to an individual character, the node relates to a unique ID for the character sequence. Table 18 shows four common character sequences where S1 relates to "diordnA".

TABLE 18

| ID | Character Sequence |
|---|---|
| S1 | diordnA |
| S2 | emorhC |

TABLE 18-continued

| ID | Character Sequence |
|---|---|
| S3 | EISM |
| S4 | arepO |

Table 19 is a modified version of Table 16 showing character position 28 referencing the string S1 from Table 18 instead of the single space character. Positions 27 to 21 are now no longer required, which reduces the amount of data stored in the trie.

TABLE 19

| Position | — | 33 | 32 | 31 | 30 | 29 | 28 | 27 | 26 | 25 | 24 | 23 | 22 | 21 | ID |
|---|---|---|---|---|---|---|---|---|---|---|---|---|---|---|---|
| Row 1 | ↘ | 4 | • | 0 | • | 4 | S1 | — | — | — | — | — | — | — | N1 |
| Row 2 |   |   |   |   | ↘ | 3 | S1 | — | — | — | — | — | — | — | N2 |
| Row 3 | ↘ | 5 | • | 0 | • | 4 | S1 | — | — | — | — | — | — | — | N3 |
| Row 4 |   |   |   |   | ↘ | 3 | S1 | — | — | — | — | — | — | — | N4 |

The unique IDs for each of the substrings contained in the trie shown in the final column of Table 19 are not altered by the presence of references to entries in the table of common sequences of characters. Any group of identical characters can be consolidated in this manner. This technique alters some of the trie data structures so that they become a type of trie known as a radix tree or a Patricia tree (see http://xlinux.nist.gov/dads//HTML/patriciatree.html).

Every possible character position of the User-Agents in the training data will contain a data structure which relates a substring ending at that position to a unique substring ID.

Whilst the invention has been described using trie data structures to relate substrings to unique identifiers, it will be appreciated that other suitable data structures could be used. For example, other suitable forms of suffix tree (explained at http://xlinux.nist.gov/dads//HTML/suffixtree.html) or suffix arrays (explained at http://xlinux.nist.gov/dads//HTML/suffixarray.html) could be used instead of, or in addition to, tries.

Once all of the identified substrings for a particular User-Agent have been stored in a respective trie, and a unique substring ID has been assigned to each substring, a unique identifier for the device can be defined. This unique identifier, which is referred to herein as a signature, is formed by the combining the substring IDs for the device's User-Agent. As was previously explained, the substrings and their respective character positions collectively form a unique identifier for a communication device or a class of similar communication devices, which is referred to herein as a pattern. It follows that a signature based upon each of those substrings will also uniquely identify a communication device or a class of similar communication devices. The advantage of forming a signature based upon the substring IDs is that a corpus of signatures can be searched more quickly than a corpus of patterns during the identification process that is described below. It is, however, possible to avoid defining signatures, although this is not desirable.

Table 20 shows examples of signatures that are derived from the training data 404 for five devices. Signature G1 is uniquely defined by its constituent substring IDs, N1, N34 and N234. The signatures are preferably stored in a table with a structure similar to Table 20. Such a table is referred to herein as a signature table. Each signature can contain one or more substring IDs. Only three substring positions are shown for brevity, however many more substring IDs could be used to form a signature. The rows of the table are ordered on the unique substring IDs forming the signature, so as to allow the table to be searched more quickly. In one example, the substring IDs for each signature are stored in ascending order of IDs, and the signatures are then ordered in ascending order of all their substring IDs.

TABLE 20

| Signature ID | Substring IDs | | | |
| --- | --- | --- | --- | --- |
| G1 | N1 | N34 | N234 | ... |
| G2 | N1 | N65 | N785 | ... |
| G3 | N1 | N345 | | ... |
| G4 | N1 | N345 | N9182 | ... |
| G5 | N2 | N234 | N785 | ... |

The example in Table 20 shows a signature comprising many Substring IDs. It is also desirable to relate a substring ID to a signature ID to speed up relating a collection of substring IDs to a limited set of signatures. Table 21 shows an example of the same data from Table 20 structured in this manner.

TABLE 21

| Substring ID | Signature IDs | | | |
| --- | --- | --- | --- | --- |
| N1 | G1 | G2 | G3 | G4 |
| N2 | G5 | | | |
| N34 | G1 | | | |
| N65 | G2 | | | |
| N234 | G1 | G5 | | |
| N345 | G3 | G4 | | |
| N785 | G2 | G5 | | |
| N9182 | G4 | | | |

Table 20 and Table 21 order the IDs in ascending order for both the first column of the table and the rows of related values. The ordering of the IDs is essential during identification to enable a divide and conquer algorithm to rapidly identify the values.

Every signature maps to a unique profile from each component. The profiles are determined from those related to the populating user agents. Thus, each signature can be associated with one or more profiles, as illustrated in step 310 of FIG. 3. This can be achieved by including a reference to one or more profiles in each row of a signature table (Tables 20 and 21). This is illustrated by item 802 in FIG. 8 (described in more detail below), which shows that signature G1 is associated with profiles H4, O4 and B7.

As a less preferred alternative to including a reference to a profile in each row of the signature table, it is possible to include references to a number of individual properties and their respective values in the signature table, or even to include the properties and their values in the signature table itself. However, the use of profiles is preferred because profiles require less memory than these alternatives, and also make it easier for the dataset to be kept up to date as new devices appear. This is because several devices that have different User-Agents may have common hardware, or a common web browser or operating system. The use of profiles, which group together several related properties and the values of those properties in a single record, takes advantage of the common characteristics of different devices. This avoids the need to store duplicated data for similar devices, and avoids the need to re-enter data when a new device is similar to a device for which data is already stored.

Finally, some or all of the data structures that have been populated during the process of generation are stored, thus forming the dataset 406. This step is illustrated by step 312 of FIG. 3. The dataset 406 is stored as one or more records on a computer-readable medium, thus enabling the dataset to be deployed to a remote service that will use the dataset to identify the properties of communication devices. Any suitable computer-readable medium can be used to store the dataset, including volatile and non-volatile media. The dataset can also exist as a transient signal (such as an electrical, electromagnetic or optical signal) during deployment.

Figure 8:
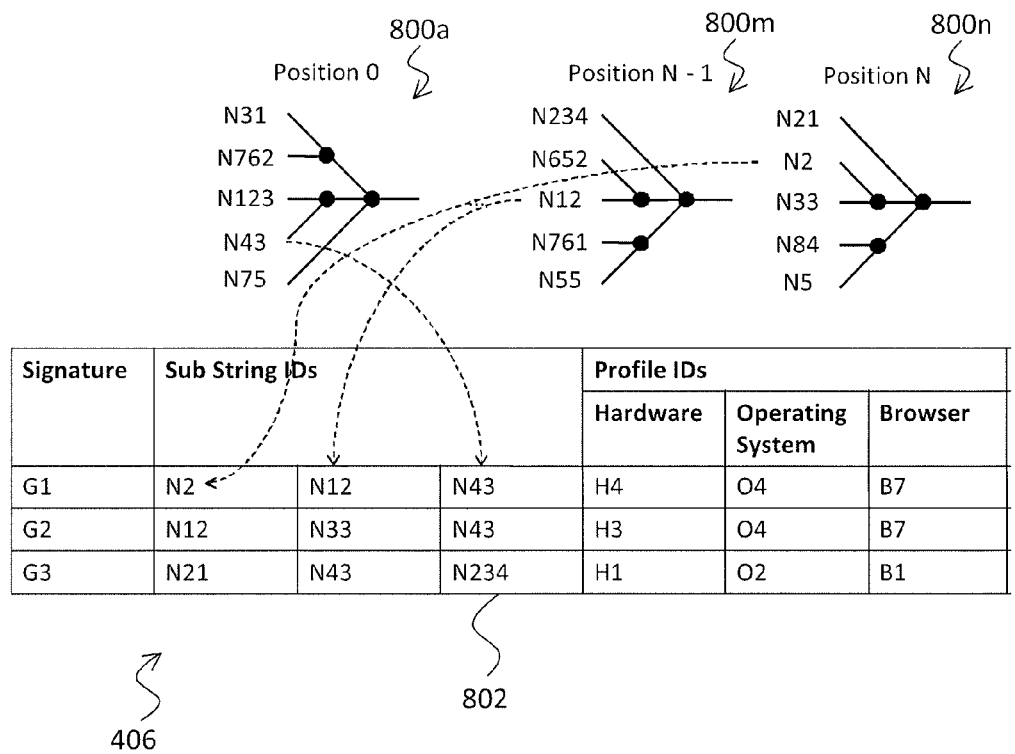
FIG. 8 is a schematic diagram of a dataset.

FIG. 8 illustrates a portion of the dataset 406. The dataset 406 comprises a plurality of tries 800, each of which is designated for storing substrings that occur at a particular character position of a User-Agent. For example, trie 800a stores substrings that occur at character position 0, trie 800m stores substrings that occur at character position N−1, and trie 800n stores substrings that occur at character position N. It will be appreciated that "a substring occurring at a character position" can mean that the substring ends or begins at that character position, depending on whether the substrings were processed from the last character position to the first character position or from the first character position to the last character position.

The dataset 406 also comprises data representing an association between the substrings that were added to the tries and a respective profile for each substring. For example, the dataset may comprise a signature table 802, which associates each substring ID with a signature and one or more profiles.

The dataset 406 may also comprise an array of patterns (not shown in FIG. 8). In this case, the dataset 406 can also comprises data representing an association between each pattern and one or more profiles to which that pattern relates. For example, the association between patterns and profiles can be stored in a table such as Table 15.

It is also possible for the dataset to comprise an array of patterns, but not the plurality of tries or the signatures. However, as explained above, this is not desirable because a table of signatures can be searched more quickly than an array of patterns.

The dataset 406 may also comprise the profiles (not shown in FIG. 8), together with associated information such as properties and the value(s) of each property. Thus, for example, the dataset 406 may include tables similar to Tables 4, 5, 6 and 8. It is preferable to include the profiles and associated information in the dataset 406, since this allows all of the information needed to identify the properties of a communication device to be deployed to a remote service in a single package. Alternatively, the profiles and associated information may be stored and deployed separately from the dataset 406.

The dataset 406 may be stored in any suitable format, such as XML, a bespoke binary format, or auto-generated source code. Other formats such as JavaScript Object Notation (JSON) could be used, depending on the capabilities of the remote service.

Figure 9:
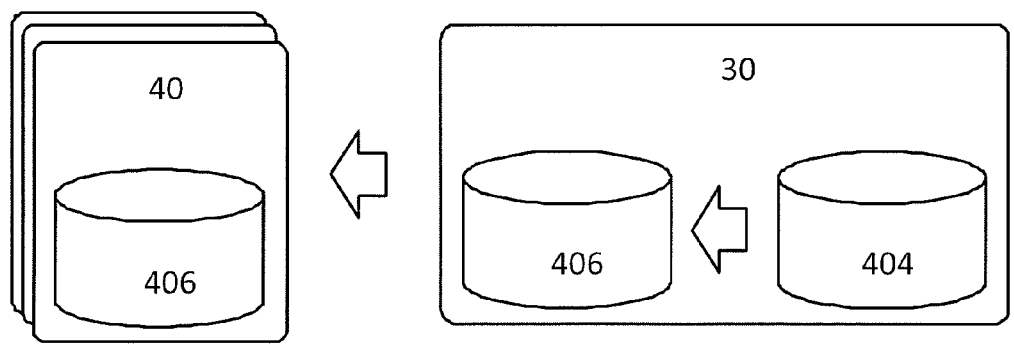
FIG. 9 is a schematic diagram of a system for generating and deploying the dataset shown in FIG. 8.

FIG. 9 is a schematic diagram of a system for generating and deploying the dataset 406. A first computer system 30 processes the training data 404 according to the method illustrated in FIG. 3, so as to generate the dataset 406. The dataset 406 is then deployed to one or more remote services 40, such as a web site. The remote services 40 can use the dataset 406 to identify the properties of communication devices, in the manner that will now be discussed.

Identification

Figure 10:
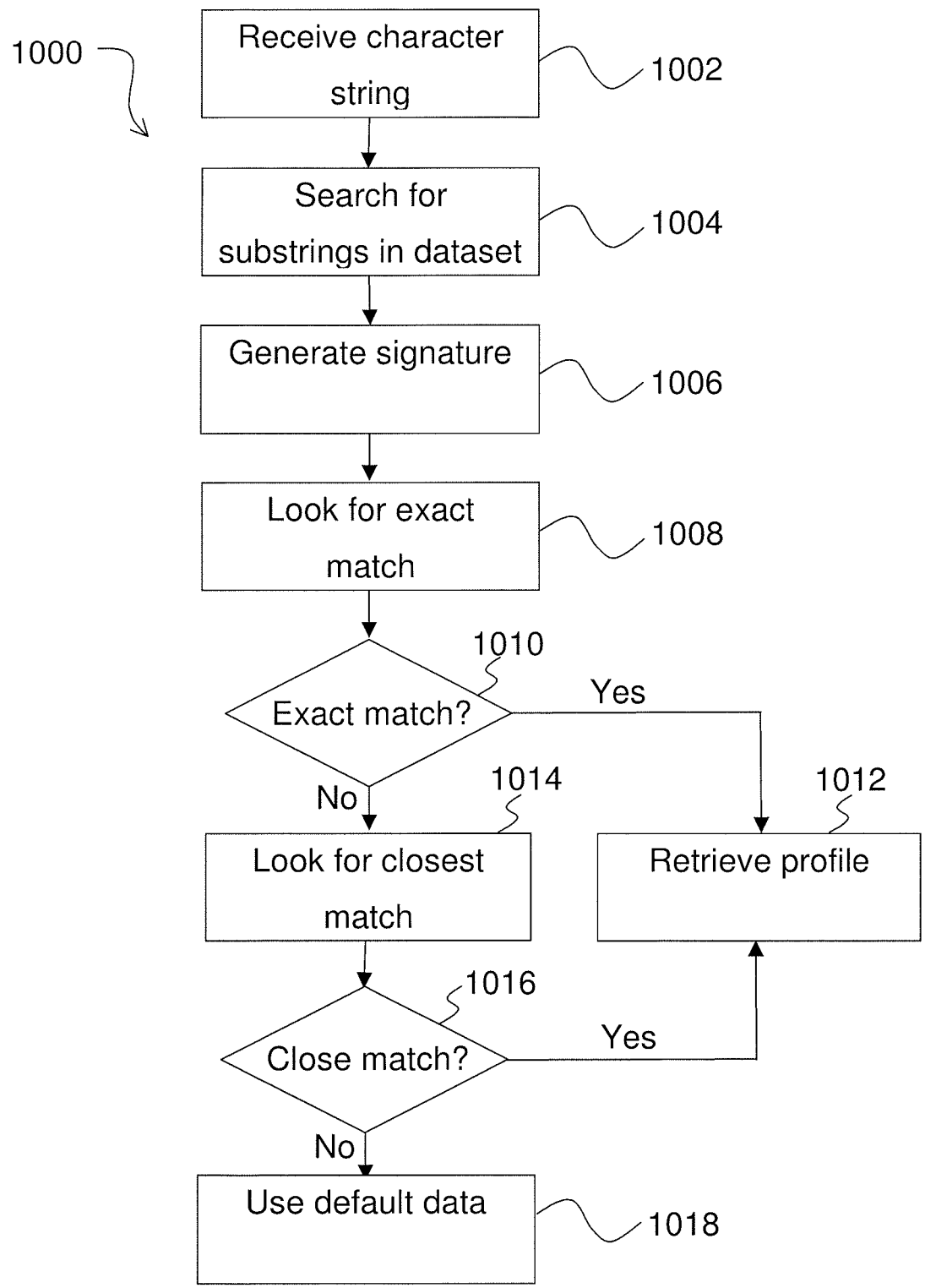
FIG. 10 is a flow diagram of a method of identifying a property of a communication device.
Figure 11:
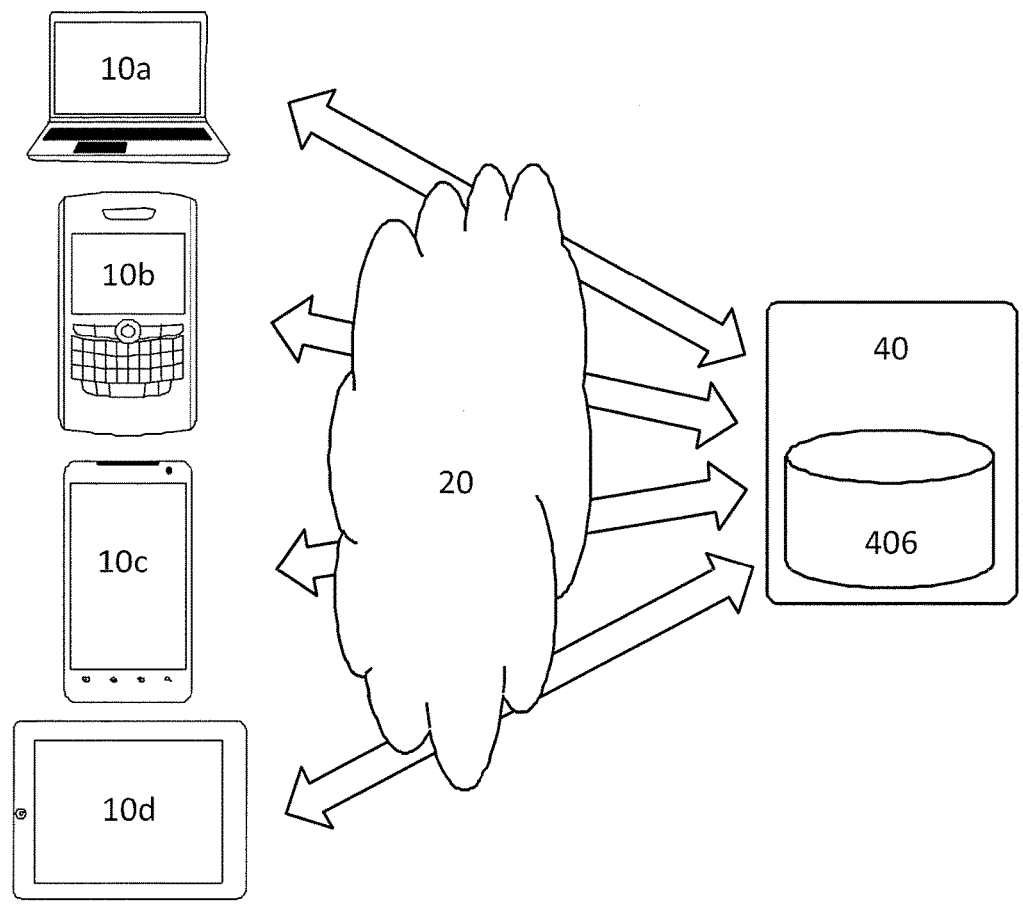
FIG. 11 is a schematic diagram of a system for identifying a property of a communication device using the dataset shown in FIG. 8.

The identification process will now be described with reference to FIGS. 10 and 11. FIG. 10 is a flow diagram of a method 1000 of identifying a property of a communication device. FIG. 11 is a schematic diagram of a system for identifying the properties of communication devices. The method of FIG. 10 is performed by a remote service 40, such as a web server. The remote service 40 comprises the dataset 406, which was generated in the manner described above. The remote service 40 can communicate with one or more communication devices 10 via a communication network 20. The communication devices may include a laptop computer 10a, a mobile phone 10b, a smartphone 10c, a tablet computer 10d and/or any other suitable type of communication device. The communication network 20 may include any suitable wire-based or wireless communication network.

The method 1000 begins at step 1002, when the remote service 40 receives a User-Agent from a communication device 10. The communication device 10 may transmit the User-Agent to the remote service when requesting a web page, in a manner that is known to those skilled in the art.

The remote service 40 analyses the received User-Agent to identify one or more substrings contained therein, as illustrated at step 1004 of FIG. 10. In the following, it will be assumed that the dataset 406 was generated by processing User-Agents in the training data 404 from the last character position to the first character position. Thus, the received User-Agent is processed by starting from its last character and working towards its first character. The identification process reads the last character of the User-Agent and evaluates the trie 800 of the dataset 406 that is designated for that character position. If a complete substring is identified, the substring ID is retrieved from the trie 800 and stored. The next character to the left of the substring is evaluated. If no match is found, the next character immediately to the left is evaluated. Evaluation continues until all substrings have been identified and all matching substring IDs have been found.

The matching substring IDs are then combined to form a signature, as illustrated in step 1006 of FIG. 10. Forming the signature involves sorting the matching substring IDs in ascending order of unique substring ID. This results in a signature, which is termed the target signature.

Exact Match

The target signature is then evaluated against the signature table 802 of the dataset 406 to look for an exact match, as illustrated in step 1008. An example of an algorithm for locating an exact match will now be described.

The signature table 802 is ordered in ascending order of substring IDs. Table 20 shows signatures ordered in this manner. A divide and conquer algorithm is preferably used to determine if a signature exactly matching the target signature is present. The divide and conquer algorithm described below has been found to be a particularly fast way of identifying an exact match. However, it will be appreciated that other suitable algorithms could be used to identify an exact match between the target signature and a signature in the signature table 802.

In the first iteration of the divide and conquer algorithm, the first signature and the last signature in the ordered signature table 802 are used as initial lower and upper signatures respectively. The signature in the middle of the lower and upper signatures is then compared to the target signature. If this middle signature is above the target signature, then the lower signature is switched to the signature after the middle signature for the second iteration. However, if the middle signature is below the target signature, the upper signature is switched to the signature before the middle signature for the second iteration. Iterations continue in this manner, narrowing in on the closest signature, until either an exact match is found, or the lower and upper values cross. If the lower and upper values cross, this indicates that an exact match for the target signature is not present in the signature table 802, and a closest match algorithm is then performed.

To illustrate the operation of the divide and conquer algorithm, consider a User-Agent comprising unique substring IDs N1, N65 and N785, which form the target signature. If the list of ordered signatures in the dataset 406 are those shown in Table 20, the two iterations shown in Table 22 would match signature G2.

TABLE 22

| Iteration | Lower Row | Upper Row | Middle Row | Target |
|---|---|---|---|---|
| 1 | G1 | G5 | G3 | Above G3 |
| 2 | G1 | G2 | G2 | Matched G2 |

Once an exact match for the signature is found in the signature table, one or more profiles associated with the signature can be retrieved, as illustrated by step 1012 in FIG. 10. The properties and values of the components of the communication device can then be retrieved from the profiles.

Now consider a User-Agent comprising substring IDs N1 and N785, which form the target signature. This target signature does not exist in Table 20, so no match will be found. Table 23 provides an example of the iterations that will be performed to determine the signature does not exist.

TABLE 23

| Iteration | Lower Row | Upper Row | Middle Row | Target |
|---|---|---|---|---|
| 1 | G1 | G5 | G3 | Below G3 |
| 2 | G4 | G5 | G4 | Below G4 |
| 3 | G5 | G5 | G5 | Above G5 |
| 4 | G5 | G4 | — | No Match |

When the training data represents the real world sufficiently well (i.e. when the training data is representative of the User-Agents transmitted by visitors to the remote service 40), a very high percentage of User-Agents will result in an exact match.

Closest Match

If an exact match can not be found at step 1010, but one or more substrings were identified at step 1004, the remote service 30 tries to identify a signature that matches the received User-Agent most closely. This is illustrated by step 1014 in FIG. 10.

For example, consider a situation where a new version of the Chrome web browser has been released after the dataset 406 was created. The dataset 406 will not be aware of this newer version. However, all other components of the device are contained within the dataset 406 and there is very little significant difference between the two versions of Chrome. Rather than returning no information, a method is needed to identify those components that are identical and to identify the version of Chrome which is closest to the new one based on the version number.

Finding the closest match to the received User-Agent preferably involves searching the array of signatures that is contained in the dataset 406, so as to find the signature that most closely matches the received User-Agent. Continuing the earlier example, if the new version of Chrome is identified with the substring "Chrome/28" at a particular character position, and the dataset 406 contains a signature that would match "Chrome/27" at the same character position, the received User-Agent and closest signature are shown in Table 24.

TABLE 24

| Received User-Agent | Mozilla/5.0 (Windows NT 6.1) AppleWebKit/537.36 (KHTML, like Gecko) Chrome/28.0.1453.93 Safari/537.36 |
|---|---|
| Closest Signature | _____Windows NT 6.1\_AppleWebKit/537.36 _____Chrome/27_____Safari/537.36 |

The closest signature shown in Table 24 contains four relevant substrings, "Windows NT 6.1", "AppleWebKit/537.36", "Chrome/27" and "Safari/537.36". Three of these substrings are contained in the received User-Agent, i.e. "Windows NT 6.1", "AppleWebKit/537.36" and "Safari/537.36". Because "Chrome/27" does not exist in the received User-Agent, an exact match could not have been found at step 1010. The only difference between the relevant characters of the received User-Agent and the closest signature is the digit "7" and "8" following "Chrome/2". A preferred example of a closest match technique uses the difference in ASCII character values to determine the closest signature.

To continue the example, three substrings were found and each of these relates to one or more signatures. Table 21 shows how substrings are related to signatures. Each of the signatures which relate to the three substrings now need to have their relevant characters compared with the received User-Agent, to determine which signature is the closest match.

The signatures to be compared with the received User-Agent are found in the following manner. Firstly, the signature table 802 in the dataset 406 is transformed (if necessary) so that it relates each substring ID to one or more signature IDs. In other words, if the signature table 802 has the same structure as Table 20, it is transformed into the structure shown in Table 21. The transformed signature table is then searched to locate one or more signatures that relate to the greatest number of substring IDs that were identified in the received User-Agent. The characters of the substrings in the received User-Agent are then compared with the characters of the substrings in the located signatures, and the difference in the ASCII character values between the two substrings is calculated. The differences are then summed to provide a total score.

The lowest score (greater than zero) obtained for all previous signatures evaluated is stored. This can be used to avoid unnecessary calculation when evaluating future signatures which would result in a higher score early in the comparison. This reduces the execution time of the algorithm when many signatures need to be evaluated.

The signature with the lowest total score (greater than zero) is considered to be the closest. One or more profiles associated with the closest signature can then be retrieved, as illustrated by step 1012 in FIG. 10.

Signatures that have a score of zero are ignored. A score of zero would suggest an exact match, but this would only be possible if a shorter signature were being evaluated. A shorter signature, however, would not actually be the closest signature.

The lowest score calculation can be refined by identifying sequences of characters that form numeric values, and by comparing the numeric values rather than the ASCII character values for these positions. Consider the example shown in Table 25, where "Chrome/29" is contained in the received User-Agent, "Chrome/19" is part of the closest matching signature when compared on ASCII characters, but "Chrome/27" would be the most desirable matching signature.

TABLE 25

| Received User-Agent | Mozilla/5.0 (Windows NT 6.1) AppleWebKit/537.36 (KHTML, like Gecko) Chrome/29.0.1453.93 Safari/537.36 |
|---|---|
| Closest Signature ASCII | _____Windows NT 6.11 AppleWebKit/537.36 _____Chrome/19_____Safari/537.36 |
| Closest Signature Numeric | _____Windows NT 6.1\_AppleWebKit/537.36 _____Chrome/27_____Safari/537.36 |

The difference between characters "2" and "1" after "Chrome/" is "1". The next character is "9" in both the first and second rows of Table 25. Therefore the total for the closest matching signature when evaluated using ASCII character differences alone would be "1". This result is shown in the second row of Table 25.

However, by changing the score calculation method when numeric characters are involved, so as to convert the numeric characters and their surrounding numeric characters to a single number value, the numbers "27", "19" and "29" would be compared. In this example, there is a difference of "2" between the received User-Agent and the third row of Table 25, which is lower than the difference of "10" with the second row of Table 25. As a result, Row 3 of Table 25 would be regarded as the closest matching signature.

The closest match algorithm works extremely effectively when a User-Agent not present in the training data, but containing only minor differences, needs to be identified. This algorithm can often find a prior version of a browser, operating system or hardware when a newer version is contained in the received User-Agent.

Other methods of signature comparison could be used, depending on the characteristics of the strings involved. LD algorithms could be used to compare substrings, or the character positions checked could be offset when exact matches are not found.

No Match

In very rare situations, no substrings are found for a User-Agent and no matching signature can be determined. In these situations, either all the signatures available could be checked using the closest match algorithm. Alternatively, default values could be returned for each of the components if there is insufficient time to check all possible signatures using the closest matching algorithm, as illustrated by step 1018 in FIG. 10.

Test Results

Comparative tests have been performed to quantify the performance improvements that can be achieved by the methods disclosed herein.

Where the training data contains two million User-Agents, a RegEx and LD based algorithm requires an average of 5.7 milliseconds to identify a device when given a User-Agent from the training data. Using the methods disclosed herein, the same result will be determined in 0.05 milliseconds where all other factors such as hardware, operating system and other workload are identical. Thus, the methods disclosed herein have been found to improve identification performance by over one hundred times.

A dataset generated according to the methods disclosed herein requires 7.6 megabytes to store information relating to two million User-Agents. In contrast, storing the same number of User-Agents in a single trie requires 55 megabytes of storage to produce identical results. Thus, the methods disclosed herein have been found to improve storage efficiency by over seven times. This improved storage efficiency is achieved by storing substrings of User-Agents in a particular one of a plurality of data structures (e.g. trie data structures), where each of the plurality of data structures is designated for storing substrings that occur (e.g. start or end) at a particular character position of a User-Agent. This eliminates the unnecessary characters of a User-Agent, e.g. by reducing the need to store characters that do not effectively distinguish between different User-Agents.

Hardware Implementation

Figure 12:
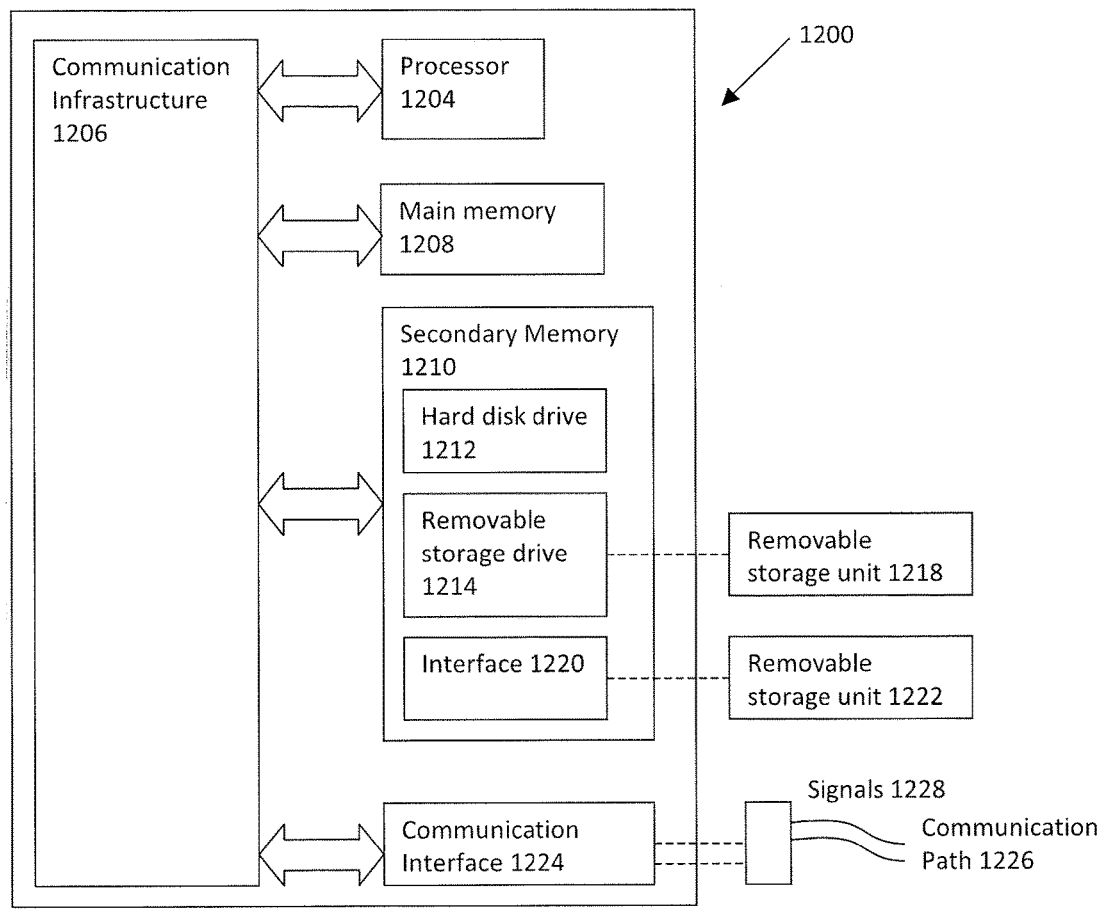
FIG. 12 is a schematic diagram of a computer system suitable for implementing the present disclosure.

An example of an apparatus that can be used to implement the invention will now be described with reference to FIG. 12. Embodiments of the present invention may be implemented as computer program code for execution by the computer system 1200. Various embodiments of the invention are described in terms of this example computer system 1200. After reading this description, it will become apparent to a person skilled in the art how to implement the invention using other computer systems and/or computer architectures.

Computer system 1200 includes one or more processors, such as processor 1204. Processor 1204 may be any type of processor, including but not limited to a special purpose or a general-purpose digital signal processor. Processor 1204 is connected to a communication infrastructure 1206 (for example, a bus or network). Various software implementations are described in terms of this exemplary computer system. After reading this description, it will become apparent to a person skilled in the art how to implement the invention using other computer systems and/or computer architectures.

Computer system 1200 also includes a main memory 1208, preferably random access memory (RAM), and may also include a secondary memory 1210. Secondary memory 1210 may include, for example, a hard disk drive 1212 and/or a removable storage drive 1214, representing a floppy disk drive, a magnetic tape drive, an optical disk drive, etc. Removable storage drive 1214 reads from and/or writes to a removable storage unit 1218 in a well-known manner. Removable storage unit 1218 represents a floppy disk, magnetic tape, optical disk, etc., which is read by and written to by removable storage drive 1214. As will be appreciated, removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that previously found in video game devices), a removable memory chip (such as an EPROM, or PROM, or flash memory) and associated socket, and other removable storage units 1222 and interfaces 1220 which allow software and data to be transferred from removable storage unit 1222 to computer system 1200. Alternatively, the program may be executed and/or the data accessed from the removable storage unit 1222, using the processor 1204 of the computer system 1200.

Computer system 1200 may also include a communication interface 1224. Communication interface 1224 allows software and data to be transferred between computer system 1200 and external devices. Examples of communication interface 1224 may include a modem, a network interface (such as an Ethernet card), a communication port, a Personal Computer Memory Card International Association (PCM-CIA) slot and card, etc. Software and data transferred via communication interface 1224 are in the form of signals 1228, which may be electronic, electromagnetic, optical, or other signals capable of being received by communication interface 1224. These signals 1228 are provided to communication interface 1224 via a communication path 1226. Communication path 1226 carries signals 1228 and may be implemented using wire or cable, fibre optics, a phone line, a wireless link, a cellular phone link, a radio frequency link, or any other suitable communication channel. For instance, communication path 1226 may be implemented using a combination of channels.

The terms "computer program medium" and "computer usable medium" are used generally to refer to media such as removable storage drive 1214, a hard disk installed in hard disk drive 1212, and signals 1228. These computer program products are means for providing software to computer system 1200. However, these terms may also include signals (such as electrical, optical or electromagnetic signals) that embody the computer program disclosed herein.

Computer programs (also called computer control logic) are stored in main memory 1208 and/or secondary memory 1210. Computer programs may also be received via communication interface 1224. Such computer programs, when executed, enable computer system 1200 to implement the present invention as discussed herein. Accordingly, such computer programs represent controllers of computer system 1200. Where the invention is implemented using software, the software may be stored in a computer program product and loaded into computer system 1200 using removable storage drive 1214, hard disk drive 1212, or communication interface 1224, to provide some examples.

In alternative embodiments, the invention can be implemented as control logic in hardware, firmware, or software or any combination thereof.

It will be understood that the invention has been described above purely by way of example, and that modifications of detail can be made within the scope of the invention. For example, whilst the invention has been described in the context of Hyper Text Transfer Protocol and User-Agents, other suitable protocols and information for identifying communication devices could also be used.

The invention claimed is:

1. A non-transitory computer-readable medium comprising information for use in identifying a property of a communication device, the communication device being arranged to transmit a character string that identifies the communication device, the character string comprising one or more substrings, wherein the information comprises:
   a plurality of trie data structures, each of the plurality of trie data structures being designated for storing substrings that occur at a particular character position in the character string, wherein:
      each trie data structure comprises one or more entries, each entry comprising a substring and a unique identifier,
      a last character of the substring is stored in a first branch node of the trie data structure, the first branch node being adjacent a root node of the trie data structure, and
      a first character of the substring is stored in a leaf node of the trie data structure;
   a signature that identifies the communication device, wherein the signature comprises a combination of the unique identifiers of one or more entries in the plurality of trie data structures; and
   data representing an association between the signature and one or more profiles, wherein each profile includes a value of at least one property of the communication device.

2. The non-transitory computer-readable medium of claim 1, wherein the data representing the association between the signature and the one or more profiles comprises a signature table with rows corresponding to signatures and including a reference to the one or more profiles.

3. The non-transitory computer-readable medium of claim 2, wherein the signature table is in ascending order for the first column of the signature table and the remaining rows.

4. A system for identifying a property of a communication device, comprising:
   at least one processor; and
   a non-transitory computer-readable medium containing instructions that, when executed by the at least one processor, cause the at least one processor to perform operations comprising:
      receiving a plurality of trie data structures storing substrings that occur at a particular character position in a character string identifying the communication device, wherein:
         each the data structure comprises at least one entry, the at least one entry comprising a substring and a unique identifier,
         a last character of the substring is stored in a first branch node of the trie data structure, the first branch node being adjacent a root node of the trie data structure, and
         a first character of the substring is stored in a leaf node of the trie data structure;
      receiving a signature based on the plurality of trie data structures that identifies the communication device;
      receiving data representing an association between the signature and one or more profiles, wherein each profile includes a value of at least one property of the communication device;
      identifying a property of the communication device based on the plurality of the data structures, the signature, and the data representing the association between the signature and the one or more profiles.

5. The system of claim 4, wherein the signature references the at least one entry of one of the plurality of trie data structures.

6. The system of claim 4, wherein the at least one entry of one of the plurality of trie data structures comprises at least two entries, and the signature comprises a combination of unique identifiers of the at least two entries.

7. The system of claim 4, wherein the data representing the association between the signature and the one or more profiles comprises a signature table with rows corresponding to signatures and including a reference to the one or more profiles.

8. The system of claim 7, wherein the signature table is in ascending order for the first column of the signature table and the remaining rows.

9. A computer-implemented method for identifying a property of a communication device, comprising:
   receiving, by at least one processor:
      a plurality of trie data structures storing substrings that occur at a particular character position in a character string identifying the communication device, wherein:
         each the data structure comprises at least one entry, the at least one entry comprising a substring and a unique identifier,
         a last character of the substring is stored in a first branch node of the trie data structure, the first branch node being adjacent a root node of the trie data structure, and a first character of the substring is stored in a leaf node of the trie data structure;
a signature based on the plurality of trie data structures that identifies the communication device, and
data representing an association between the signature and one or more profiles, wherein each profile includes a value of at least one property of the communication device; and identifying a property of the communication device based on the plurality of trie data structures, the signature, and the data representing the association between the signature and the one or more profiles.

10. The computer-implemented method of claim 9, wherein the signature references the at least one entry of one of the plurality of trie data structures.

11. The computer-implemented method of claim 9, wherein the at least one entry of one of the plurality of trie data structures comprises at least two entries, and the signature comprises a combination of unique identifiers of the at least two entries.

12. The computer-implemented method of claim 9, wherein the data representing the association between the signature and the one or more profiles comprises a signature table with rows corresponding to signatures and including a reference to the one or more profiles.

13. The computer-implemented method of claim 12, wherein the signature table is in ascending order for the first column of the signature table and the remaining rows.

* * * * *